United States Patent Office 3,740,230
Patented June 19, 1973

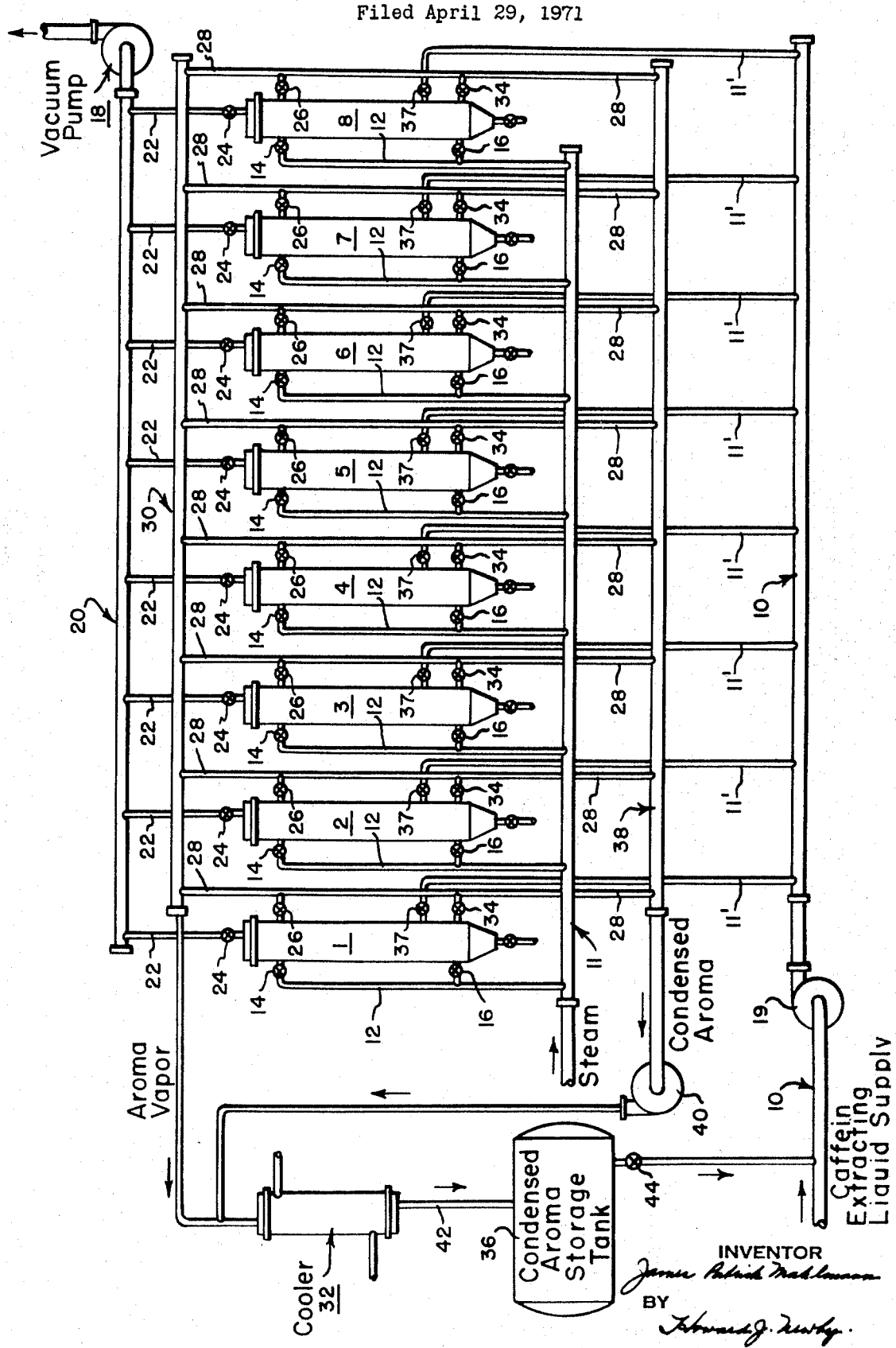

3,740,230
PROCESS FOR DECAFFEINATING COFFEE
James Patrick Mahlmann, Wayne, N.J., assignor to General Foods Corporation, White Plains, N.Y.
Filed Apr. 29, 1971, Ser. No. 138,518
Int. Cl. A23f 1/10
U.S. Cl. 99—69                       5 Claims

ABSTRACT OF THE DISCLOSURE

A decaffeinated coffee having quality improvement is effected by removing the green coffee flavors and aromas prior to introducing the coffee into one end of a counter current extraction zone for water extracting the caffeine from the coffee and then adding back the flavors and aromas to the decaffeinated coffee at the other end of the counter current extraction zone prior to discharging the decaffeinated coffee from the extraction zone.

BACKGROUND OF THE INVENTION

Field of the invention

This invention relates to the continuous decaffeination of green coffee beans and, in particular, is directed to an improved continuous counter current water extraction process whereby the desirable green coffee aromas and flavors are retained. The retention of these aromatics brings about a decaffeinated roasted coffee having substantially the same flavor and aroma as that obtained from roasting the original undecaffeinated coffee beans.

Description of the prior art

The commercial production of decaffeinated coffee, intended for use as a beverage, was instituted more than 60 years ago. The primary intent has been, and continues to be, the removal of the caffeine without removing or affecting adversely those other constituents of the coffee which provide its characteristic flavor and aroma. These desirable constituents are, for the most part, water-soluble and the original decaffeination process, currently in use to some extent, employs water-immiscible organic solvents to selectively extract the caffeine from the bulk of such water-soluble constituents. The direct contact, however, of the organic caffeine solvent, for example benzene or trichloroethylene, with the coffee removes waxes and oils and produces adverse effects on the remaining constituents of the coffee with consequent deterioration of the flavor and aroma of the coffee beverage.

In order to avoid the direct contact of the organic solvent with the coffee, various processes have been devised for the extraction of caffeine directly with water. The one process for the water extraction of caffeine from green coffee beans which has attained considerable commercial success during the past 20 years is the process described in detail in U.S. Pat. No. 2,309,092. According to this process, the extraction medium is a water solution of green coffee water solubles, other than caffeine, at a concentration in equilibrium with the water soluble solids in the green coffee. This aqueous extract is continuously recycled through the green coffee and through a liquid-liquid extraction with a water-immiscible, organic caffeine solvent such as one of those mentioned above. This method produces decaffeinated coffee of superior flavor and aroma for beverage purposes due to the fact the organic caffeine solvent does not come in direct contact with the green coffee beans and, therefore, undesirable reactions are not as prone to take place as is manifect in the process of extracting caffeine by direct contact of the green beans with organic solvent.

Although the water extraction process for decaffeinating coffee as developed by Berry et al. and described in U.S. Pat. No. 2,309,092 was a decided advance in the art, there exists in the process certain processing conditions which have precluded the obtainment of a finished product which equals that of undecaffeinated coffee in taste and aroma quality as judged by the average consumer.

OBJECTS OF THE INVENTION

It therefore becomes an object of the present invention to provide an improved decaffeinated coffee having a flavor and aroma, after roasting, substantially the same as that of the roasted original undecaffeinated coffee.

It is another object of the invention to provide a decaffeinated coffee superior in flavor and aroma to that produced by the process described in U.S. Pat. 2,309,092.

It is a further object of this invention to improve upon and otherwise refine the continuous counter current decaffeination process developed by Berry et al. as described in U.S. Pat. No. 2,309,092 without the need for adding extensive complicated processing equipment or complex operational procedures and without detracting from the economy, practicality and efficiency of the aforementioned patented process.

SUMMARY OF THE INVENTION

Basically, the present invention comprehends the inclusion of an additional processing step to those operations existing in the present commercially successful continuous decaffeination process described in U.S. Pat. 2,309,092. Therefore, the entire content of the specification of U.S. Pat. 2,309,092 forms part of this specification by reference and a reading of that specification is essential to attain a complete understanding of the present invention. The essential material contained in the aforementioned patent is, in fact, necessary for adequately disclosing the present invention.

As indicated in the referenced patent, the success of the water extraction process rests on the avoidance of having organic caffeine solvent from coming into direct contact with the green coffee beans to be decaffeinated. To bring this about, the water extract is employed as an intermediate medium wherein it first extracts the caffeine from the coffee and then the caffeine is liquid-liquid extracted from the water extract with an organic caffeine solvent. In order for the technique to succeed, the organic solvent, once laden with caffeine, must be amenable to physical separation from the water extract—i.e., it is essential that the organic solvent be immiscible with the water extract. Judicious selection of organic solvent is, therefore necessary and, as a result, thichloroethylene has been employed because of its high degree of immiscibility with the water extract and because of its desirable density, volatility, and non-flammability properties.

Unfortunately, when the caffeine laden water extract is subjected to a liquid-liquid extraction with trichloroethylene or other organic caffeine solvents, an emulsion is formed and some of the organic solvent is entrained with the water extract exiting from the liquid-liquid extraction column. Also, regardless of which organic solvent is employed, none is completely immiscible with the water extract and, therefore, as the water extract is depleted of its caffeine content, it dissolves and entrains some solvent. In order to separate substantially all of the entrained (and dissolved) organic caffeine solvent from the caffeine-free water extract, the extract is subjected to a fractionating process. The quantity of heat input and the temperature to which the water extract is subjected in order to vaporize off the solvent has a decided dertimental effect on the quality of the dissolved coffee solids, flavors, and aromas remaining in the water extract. In addition to this heat treatment, which virtually destroys all flavor and aroma components, a significant amount of the green coffee aromas and flavors is also extracted from the water extract by the organic solvent as it extracts the caffeine. In view of the fact the water extract is continuously recycled, it becomes evident that on each successive pass through the counter current extraction zone, it continues to remove green coffee aromas and flavors which are either destroyed, degraded, or lost to the organic caffeine solvent. Understandably, these adverse chemical reactions are brought about in the fractionating column because of the necessity to use high temperatures to separate solvent from water extract. This deficiency of the existing process plus the fact the water extract is maintained at an elevated temperature of 212° F. during the extended period of extracting the caffeine from the green beans leads to the loss and/or degradation of a significant amount of the desirable green coffee flavors and aromas.

The essence of the present invention is to upgrade the decaffeinated green coffee beans produced by the aforementioned patented counter current water extraction system by preventing the fresh green bean aromas and flavors from coming in contact with the water extract until the very last phase of the extraction period and then for only a relatively short period of time. These desirable, fresh green coffee aromas and flavors are, in effect, removed from the green coffee before it is subjected to the caffeine extraction process and are then added back to the green coffee at, or near, the end of the caffeine extraction cycle and, accordingly, will improve the quality of the coffee to the extent that when roasted, it has substantially the same flavor and aroma as the original undecaffeinated coffee.

BRIEF DESCRIPTION OF THE DRAWING

In order that the present invention may be more clearly understood, reference will now be had to the accompanying drawing in which the present invention is illustrated by way of example. The drawing illustrates one preferred arrangement of the additional piping, pumps and tanks required for modifying the extraction system as described in U.S. Pat. 2,309,092 for practicing the invention.

DESCRIPTION OF THE PREFERRED EMBODIMENTS

As will be understood from the following description read in conjunction with U.S. Pat. 2,309,092 and the drawing of this specification, the inventive process comprises steam treating fresh green coffee beans, prior to caffeine extraction for an optimum period during which the steam will extract desirable green bean aromas, essences and flavors. The steam treatment of the green beans can be accomplished at pressure above atmosphere with correspondingly high attendant temperatures or at pressures below atmospheric (vacuum) at relatively low temperatures. Subsequently, the aroma laden steam is partially or completely condensed and the vapors and/or aqueous solution of flavors and aromas are then incorporated with green beans (previously steam dearomatized) at, or near, the end of the decaffeination cycle.

With but slight modification in equipment, the process can be accomplished in the battery of extractors described in the section "(I)—Coffee Extraction" at the beginning of column 2 of U.S. Pat. 2,309,092 and illustrated in FIG. 1A of the drawing of that patent.

Essentially, in order to practice the instant invention, what is needed in the way of modifying the present system as described in U.S. Pat. 2,309,092 is to provide means for introducing steam to the extractors and means for collecting and reintroducing the green coffee aromas at the proper point in the extraction cycle.

Referring to the figure, steam for extracting the green coffee aromas is selectively admitted to each of the extractors, consecutively numbered 1 through 8, through the steam supply header 11 and the system of branch pipes 12 and valves 14 and 16. As shown, the steam may be introduced into each extractor in proximity of the top of the extractor through valve 14, at the bottom through valve 16, or, if desired, simultaneously at both top and bottom.

Each of the extractors may be evacuated by means of the vacuum pump 18 connected to the extractor through the vacuum header 20 and the branch pipe lines 22. Selected evacuation of each extractor is controlled by means of valves 24.

The partially condensed steam laden green coffee aromas are expelled from a point near the top of each of the extractors through valve 26, branch line 28 and the aroma vapor header 30 to a cooler 32. The steam condensate solution of green coffee aromas exits from each of the reactors through a port near the bottom of the reactor, through valve 34, branch line 28, condensed aroma header 38 and is pumped to the inlet of the cooler 32 by means of pump 40.

The steam condensate solution of aromas flow from the cooler 32 through pipe line 42 and are collected in the condensed aroma storage tank 26.

As shown in the figure, the water solution of green coffee aromas is returned to the selected extractor (at the proper point of time in the extraction cycle) by being admitted to, and blended with, the caffeine extracting liquid by means of valve 44. The blend of aroma solution and extracting liquid are delivered to the proper extractor by means of pump 19, supply header 10, branch lines 11', and valves 37.

In the practice of the process according to this invention, and assuming that the battery of extractors is in normal operation, when extractor No. 3 has been filled with green coffee, then extractor No. 4 is the first in the series relative to the flow of caffeine extraction liquid and extractor No. 3 will become the last. Extractor No. 3, is, upon the completion of being filled with green coffee, isolated from the other extractors in the system and steam at pressures above atmospheric pressure, preferably 50 to 150 p.s.i.g., is introduced into extractor No. 3.

The steam pressure is maintained in the extractor until substantially all of the desired green coffee aromatics are solubilized and vaporized. Depending on the steam pressure employed, the quality of the steam, and the particular blend of green coffees to be decafeinated, steaming will occur over a period of time ranging from about 5 minutes to about 20 minutes. Upon the completion of steaming, or shortly before, the steam vapors, laden with the green coffee aromatics, are expelled from column 3 via the vapor header 30 into the aforementioned cooler 32 where they are partially or completely condensed and are then retained in the holding tank 36.

The steam condensate solution of aromas are drained from column 3 through valve 34, branch pipe line 28 and pumped to the inlet of the cooler 32 by pump 40 through line 38. The cooled aroma-containing condensate is then also drained to the condensed aroma storage tank 36.

From the condensed aroma storage tank, the green coffee aroma-containing condensate is directed into the header 10 and mixed with the caffeine extracting liquid. The aroma-containing extracting liquid is then pumped into extractor No. 4 where the aromas are infused into the substantially decaffeinated green coffee shortly before expelling the green coffee from extractor No. 4 prior to washing, drying, and roasting the decaffeinated coffee. The process is repeated in a similar manner in succession with extractors 4–5, 5–6, 6–7, 8–1, 2–3, etc.

In the event it is desirous to extract the aromas from the green coffee with steam under conditions of reduced pressure and temperature, column 3 (as in the above description) after being isolated from the rest of the system, is filled with green coffee and then evacuated of air and vapor to a desired reduced pressure which, through suitable standard controls can be maintained during the period the steam is introduced into the column and during that period of time the steam, at reduced temperature is contacting the green coffee beans to extract the aromas therefrom.

From a reading of the above, it should be apparent that the desirable green coffee flavors and aromatics are removed from the coffee prior to the coffee being subjected to a prolonged period of contact with the water extract at elevated temperatures. The green coffee aromas and flavors are, therefore, not subject to being degraded and/or dissolved by the water extract and eventually lost to the finished product. Rather, the fresh green coffee aromas and flavors are captured and are returned to the decaffeinated coffee at that point in the system where the aromas and flavors can be employed in a most beneficial manner to impart flavor to the decaffeinated coffee when it is roasted. Consequently, the retention of the substantially undegraded aromas and flavors with the decaffeinated coffee assures a roasted decaffeinated coffee having about the same aroma and flavor as the original undecaffeinated coffee when similarly roasted.

Reasonable variations and modifications are possible with the foregoing disclosure, without departing from the scope of the invention as defined by the following claims.

What is claimed is:

1. In a process for the counter current extraction of caffeine from green coffee which comprises adding coffee to one end of an extraction zone and withdrawing it from the other end while flowing a water solution of coffee solubles through said zone counter current to the coffee, circulating said solution through said zone and through a separate liquid-liquid extraction zone in which its caffeine content is removed by contact with an organic solvent, washing the coffee withdrawn from said first-named zone in an amount of water substantially equal to the amount of said solution absorbed by the coffee, and adding said wash water to said solution to maintain a substantially constant volume thereof, the improvement which comprises;

(1) contacting the green coffee with a member of the group consisting of water, water vapor and mixtures thereof to solubilize and volatilize aromas and flavors thereof prior to adding the coffee to one end of said extraction zone, (2) separating said solubilized and volatilized aromas from the coffee, and (3) contacting said aromas and flavors with green coffee prior to withdrawing it from the other end of said extraction zone.

2. The process of claim 1 wherein the solubilized and volatilized aromas and flavors are condensed to an aqueous solution and said solution contacts the green coffee at the other end of said extracting zone.

3. The process according to claim 1 wherein the solubilized and volatilized aromas are added to the water solution of coffee solubles as it contacts the green coffee at the other end of said extraction zone.

4. The process according to claim 1 wherein the green coffee, prior to adding said green coffee to one end of the extraction zone, is contacted with steam at pressures ranging from about 50 to about 150 p.s.i.g.

5. The process according to claim 4 wherein the green coffee is contacted with steam for a period ranging from about 5 to about 20 minutes.

References Cited
UNITED STATES PATENTS

| | | | |
|---|---|---|---|
| 2,309,092 | 1/1943 | Berry et al. | 99—70 |
| 2,933,395 | 4/1960 | Adler et al. | 99—69 X |
| 3,532,507 | 10/1970 | Cascione | 99—71 |
| 2,817,588 | 12/1957 | Barch | 99—69 X |
| 2,472,121 | 6/1949 | Ornfelt | 99—70 |

TIM R. MILES, Primary Examiner

W. L. MENTLIK, Assistant Examiner

U.S. Cl. X.R.

99—70